(No Model.)
J. B. ENTZ & W. A. PHILLIPS.
SECONDARY BATTERY PLATE.
No. 421,916. Patented Feb. 25, 1890.
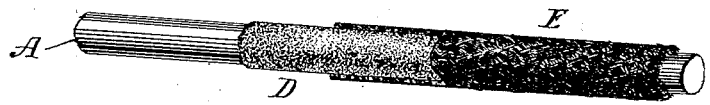
Fig. 1.
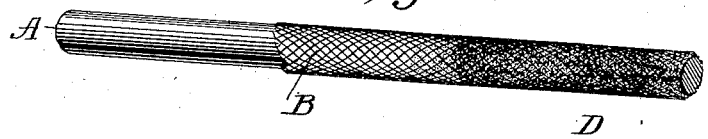
Fig. 2.
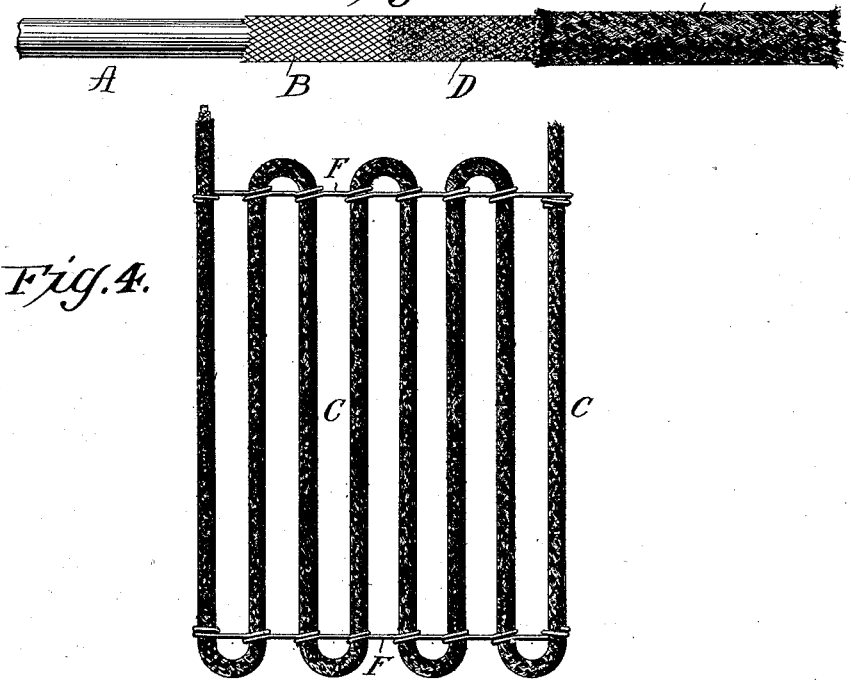
WITNESSES:
INVENTORS
Justus B. Entz
William A. Phillips
BY
ATTORNEY.

UNITED STATES PATENT OFFICE.

JUSTUS B. ENTZ AND WILLIAM A. PHILLIPS, OF SCHENECTADY, ASSIGNORS TO SAID JUSTUS B. ENTZ, AND MONTGOMERY WADDELL, OF NEW YORK, N. Y.

SECONDARY-BATTERY PLATE.

SPECIFICATION forming part of Letters Patent No. 421,916, dated February 25, 1890.

Application filed October 9, 1889. Serial No. 326,473. (No specimens.)

*To all whom it may concern:*

Be it known that we, JUSTUS B. ENTZ, a citizen of the United States, and WILLIAM A. PHILLIPS, a subject of the Queen of Great Britain, both residing in Schenectady, in the county of Schenectady and State of New York, have invented certain new and useful Improvements in Secondary Batteries, of which the following is a specification.

Our invention relates to a battery-plate containing certain novel features of construction, which are equally important and available whether the plate be used in a primary or secondary battery.

For the scope of the invention reference is herein made to the claims forming part of the specification; but the nature of our improvement may be outlined by observing that we have constructed a flexible wire having braided or woven thereon a net-work of finer wire, in the meshes of which a metallic oxide or salt may be firmly embedded. A battery-plate of any desired shape can be made by bending or weaving this wire into a grid or mat, or the wire can be manufactured in bulk, and then sold in any desired quantities, either before or after the application of the oxide, leaving the purchasers free to treat and use it as they may desire. A battery-plate of the above construction may be made out of any of the metals usually employed for such purposes; but we prefer a copper-wire core, around which is spun the net-work of finer copper wires, and the coating will consist of a layer of oxide of copper. If now this plate be used as the negative element of a zinc and copper primary battery in a solution of caustic potash, the hydrogen set free in the cell and tending to coat the plate will combine with the oxygen in the oxide, leaving a deposit of pure metallic copper in the meshes of the net-work. The plate is therefore non-polarizable, and to reoxidize it it is simply necessary to heat the plate, when it will oxidize in the air. When this same plate is used as the negative element in a storage-battery, the copper oxide serves as the active material to which goes the oxygen liberated during the charge. The wire net-work holds the material firmly in place, so that the plate will stand the heaviest discharge uninjured.

Our invention is illustrated in the accompanying drawings, wherein—

Figure 1 represents a perspective view showing the plain copper wire covered with the oxide paste and partially enveloped by an insulating-sheathing. Fig. 2 is a similar view showing the wire core and net-work with the oxide paste applied upon a portion of the wire. Fig. 3 shows the wire core with the net-work and paste, and also the sheathing. Fig. 4 shows a battery-plate formed of the wire.

A represents a flexible solid wire core of copper, though we do not intend to be in any wise limited to the particular metal employed, and B is an open net-work of finer copper wire braided around the core and having firmly embedded in its meshes an oxide of copper D, which will be applied usually in the form of a paste or cement. As an additional means for holding the oxide upon the core, as well as to prevent the plates from touching in the solution, there may be braided around the wire a sheathing of insulating textile material E—such as cotton—similar to the covering of the ordinary insulated electric wire; but this is not an essential part of our invention, and may be dispensed with when desired. This wire may be sold as a new article of manufacture, or battery-plates similar in form to those already in use may be made therefrom by bending the wire back and forth upon itself to form a series of parallel loops, as at C, Fig. 4, and these loops will be tied together by connecting wires F F to hold them in place.

We claim as our invention—

1. As an article of manufacture, the wire core covered with a braid or net-work of finer wire and adapted for use in a battery element, as described.

2. As an article of manufacture adapted for use as a battery element, the flexible copper wire covered with a braid or net-work of finer wire and having a metallic oxide embedded in the net-work, as described.

3. As an article of manufacture adapted for use as a battery element, a flexible wire having a metallic oxide applied thereto, as a paste or cement, and a sheathing of insulating textile material, as described.

4. A secondary-battery element consisting of a core or support and a surrounding woven or braided wire net-work for holding the active material in place.

5. A secondary-battery element consisting of a solid flexible wire core, a net-work of finer wire around the core, and an active material embedded in the meshes of the net-work, as set forth.

6. A battery element consisting of the wire core, the surrounding net-work of finer wire, the active material embedded therein, and the sheathing of insulating textile material.

7. A battery element consisting of the copper-wire core, the surrounding net-work of finer copper wire, the copper oxide embedded therein, and the sheathing of insulating textile material, substantially as described.

8. A battery-plate consisting of the flexible wire core and surrounding wire net-work bent into parallel loops to form a grid or mat, and a suitable active material secured to said plate by being embedded in the net-work, as described.

9. A battery-plate consisting of a wire having a metallic net-work surrounding it, active material embedded in the meshes of said net-work, and a sheathing of insulating porous material.

In witness whereof we have hereunto signed our names in the presence of two subscribing witnesses.

JUSTUS B. ENTZ.
WILLIAM A. PHILLIPS.

Witnesses:
ARTHUR VAN DER LINDE,
J. G. L. ACKERMAN.